April 7, 1925.

E. C. BATCHELDER

CLUTCH

Filed Oct. 19, 1923

Inventor:
Edward C. Batchelder,
By his attorney, Charles L. Gooding.

April 7, 1925.

E. C. BATCHELDER 1,532,116

CLUTCH

Filed Oct. 19, 1923   2 Sheets-Sheet 2

Inventor:
Edward C. Batchelder
by his attorney,
Charles S. Gooding.

Patented Apr. 7, 1925.

UNITED STATES PATENT OFFICE.

EDWARD C. BATCHELDER, OF PORTSMOUTH, NEW HAMPSHIRE, ASSIGNOR TO MORLEY BUTTON MANUFACTURING COMPANY, OF PORTSMOUTH, NEW HAMPSHIRE, A CORPORATION OF MAINE.

CLUTCH.

Application filed October 19, 1923. Serial No. 669,459.

*To all whom it may concern:*

Be it known that I, EDWARD C. BATCHELDER, a citizen of the United States, residing at Portsmouth, in the county of Rockingham and State of New Hampshire, have invented new and useful Improvements in Clutches, of which the following is a specification.

This invention relates to an improved clutch.

The object of the invention is to provide a two part clutch which may be manually or automatically operated to lock the driving member of the clutch to a shaft during one rotation thereof and which will operate to automatically disengage one part of the clutch from the other at the end of one rotation of the shaft driven thereby.

The object of the invention is further to provide a clutch of the character set forth which, after the two parts of the clutch have been moved into interlocking engagement with each other and the shaft driven by the clutch through a single rotation, the clutch will automatically operate a clutch member shifting means to disengage the interlocking members of the clutch and to lock one of said members out of engagement with the other.

The object of the invention is still further to provide contact means on one of the clutch members which is of such a construction that it will engage contact means positioned on the clutch shifting means and will not only disengage the two clutch members from each other, but will so position the contact means whereby this result is accomplished, that upon further rotation of the driving clutch member, one of said contact means will be positioned entirely outside the rotary path of the other contact means so that when the clutch is not in operation, there will be no noise caused by one of the contact means touching the other during its rotation.

The device of this invention may be used in connection with mechanisms of various kinds and is particularly adapted to be used in connection with severing mechanisms for wet paper machines and as embodied in such a machine the device of this invention has been described and illustrated in connection with a co-pending application made by me on October 19, 1923, Serial No. 669,460 and entitled "Severing mechanism for wet paper machines".

The invention consists in a clutch such as hereinafter described and particularly as pointed out in the claims.

Referring to the drawings.

Like numerals refer to like parts throughout the several views of the drawings.

Figure 2:
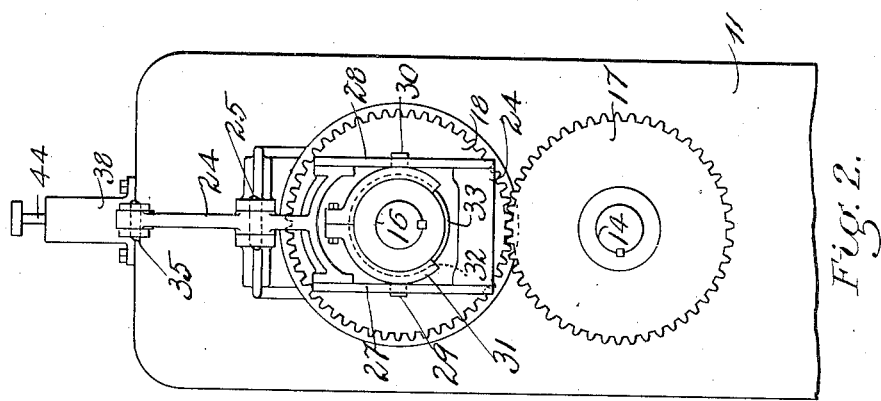
Fig. 2 is a side elevation of the same as viewed from the right of Fig. 1.

In the drawings, 10 is the frame of a machine upon which my improved clutch is mounted and comprising two side frames 11 and 12 rigidly joined together by a cross bar 13. 14 is a driving shaft rotatably mounted in bearings provided in the side frames 11 and 12 and driven by any suitable means such as a pulley 15. 16 is a driven shaft. 17 is a gear fast to the shaft 14 and meshing into a gear 18 which is rotatably mounted upon the shaft 16. The gear 18 has a hub 19 thereon provided with a recess 20 in its outer edge and said gear 18 and hub 19 constitute one member of a clutch 21. The other member 22 of the clutch is splined to the shaft 16 and is slidable longitudinally thereon. The member 22 has a projection or tooth 23 thereon adapted to engage the recess 20 in the hub 19 when moved longitudinally of the shaft 16 or toward the left, Fig. 1. The clutch member 22 is moved longitudinally of the shaft to cause the same to engage the clutch member 19 by a shifting lever 24 which is pivoted at 25 to a bracket 26 fast to the side frame 11. The lever 24 is bifurcated at its lower end, see Fig. 2, and embodies at said lower end two arms 27 and 28 to which is pivotally mounted by trunnions 29 and 30 a two-part segmental ring 31 which is provided with a groove 32 into which a flange 33 on the periphery of the clutch member 22 projects.

Figure 1:
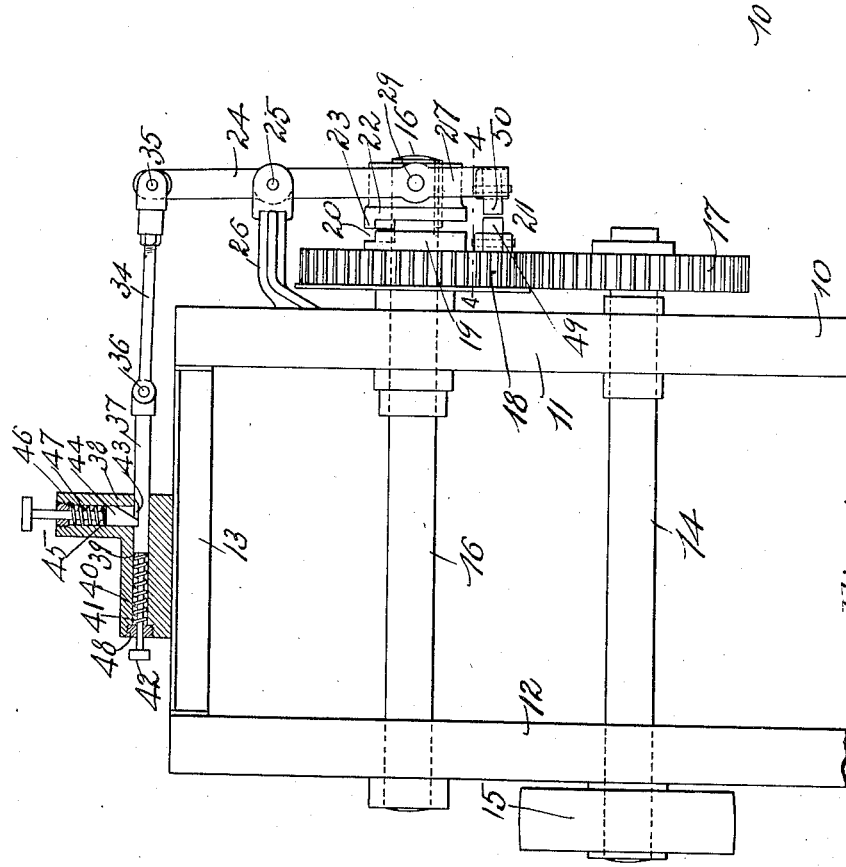
Figure 1 is a front elevation of a machine broken away and partly shown in section illustrating my improved clutch mechanism.

It will thus be seen that if the upper end of the lever 24 is rocked toward the right, Fig. 1, the clutch member 22 will be thrown into engagement with the clutch member 19 and vice-versa. The shifting lever 24 is moved toward the right at its upper end, Fig. 1, to throw the clutch member 22 into engagement with the member 19 by a link 34 pivoted at one end thereof by a pin 35 to the upper end of the shifting lever 24 and at the other end thereof said link is pivoted by a pin 36 to a spring actuated member 37 slidably mounted in a bracket 38 which is fastened to the cross beam 13 of the frame. The spring actuated member 37 has a shoulder 39 thereon which engages a spring 40 positioned in a chamber 41 provided in the bracket 38. The outer left hand end of the spring actuated member 37 has a head 42 thereon constituting a stop. The spring actuated member 37 is provided with a notch 43 into which the lower end of a spring actuated stop 44 projects when the parts are in the relative positions illustrated in Fig. 1. The spring actuated stop 44 has a shoulder 45 thereon against which the lower end of a spring 46 bears, the spring 46 being located in a chamber 47 provided in the bracket 38.

When the spring actuated stop member 44 is lifted out of engagement with the notch 43, the spring 40 will cause the spring actuated member 37 to move toward the right until the head 42 engages a screw threaded sleeve 48 in the bracket 38 and this movement of the spring actuated stop member transmitted through the link 34 will rock the lever 24 toward the right at its upper end, Fig. 1, and this will cause the clutch member 22 to be moved toward the left until the tooth 23 enters the recess 20 on the clutch member 19, whereupon the clutch member 22 will be rotated by the gear 18 and as it is splined to the shaft 16, said shaft 16 will be rotated together with any parts which may be mounted thereon.

The clutch member 22 is thrown out of engagement with the clutch member 19 by a pair of contact members 49 and 50 which are pivoted at 51 and 52 respectively to the clutch member 19 and to the lower end of the shifting lever 24. Normally these contact members are in the relative positions illustrated in Fig. 3 and are held in such position by springs 53 and 54 respectively. The contact member 49 has a segmental arm 55 and a stop arm 56 thereon. The contact member 50 has a segmental arm 57 and a stop arm 58 thereon. The curved contact face 55' of the contact member 49 is eccentric to its pivot 51 and the curved contact face 57' of the contact member 50 is eccentric to its pivot 52.

Figure 3:
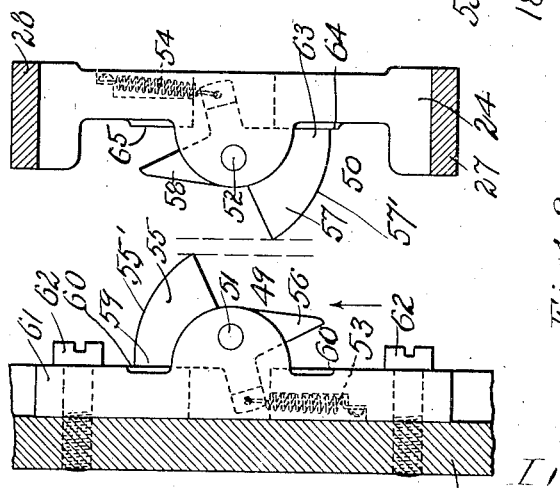

When the parts are in the positions illustrated in Fig. 3, the spring 53 holds one end 59 of the segmental arm 55 against the face 60 of a plate 61 which is fastened by screws 62 to the clutch member 19 and forms a part thereof. At the same time the end 63 of the segmental arm 57 abuts against a stop face 64 on the lower end of the lever 24 and is held thereagainst by the spring 54.

Figure 5:
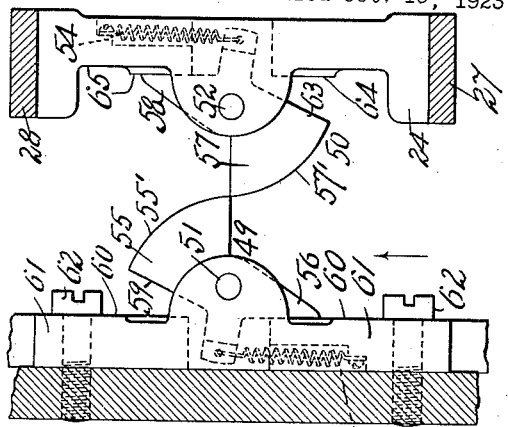
Figs. 3, 4 and 5 are enlarged sectional details taken on line 4—4 of Fig. 1, illustrating different positions assumed by one of the clutch members and the shifting lever and illustrate particularly the operation of the contact means whereby the shifting lever is moved away from one of the clutch members in order to disengage the two interlocking members of the clutch.

When the contacts 49 and 50 are in the relative positions illustrated in Fig. 5, then the stop arm 56 abuts against the face of the plate 61 and the stop arm 58 abuts against the stop face 65 on the lever 24 as illustrated in Fig. 5.

The general operation of the device hereinbefore specifically described is as follows:—Assuming the parts to be in the relative positions illustrated in the drawings Figs. 1, 2 and 3, and it is desired to throw the clutch into operation; the spring actuated stop 44 is manually operated to disengage the same from the notch 43 in the spring actuated member 37 and this will throw the clutch member 22 into engagement with the clutch member 19 and as the gear 17 continues to rotate the gear 18 the clutch member 22 will be rotated, together with the shaft 16, as hereinbefore described.

Figure 4:
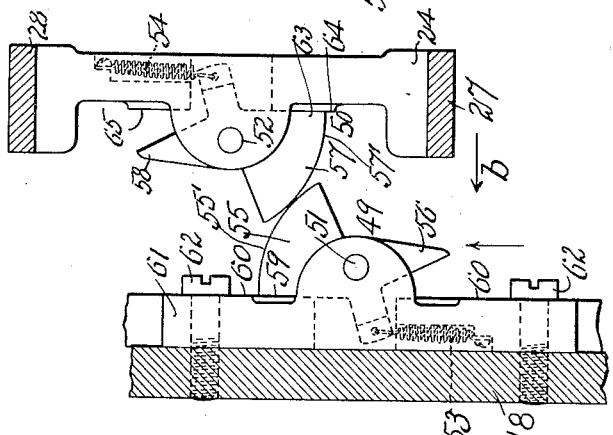

Before this operation takes place, the contact member 50 is entirely out of the path of the contact member 49. When the clutch is thrown into operation, however, as hereinbefore described, the contact member 50 on the lower end of the shifting lever 24 will be moved toward the left in the direction of the arrow $b$, Fig. 4, and this will bring the contact member 50 into the rotary path of the contact member 49. The clutch members now being locked together, the contact member 49 will move in its circular path until it assumes the position relatively to the contact member 50 illustrated in Fig. 4, then upon further rotation of the clutch member 19, the contact surfaces 55' and 57' will come into contact with each other and the contact members will be rocked upon their respective pivots until they assume the relative positions illustrated in Fig. 5 with the stop arms 56 and 58 in contact with their respective stop faces 60 and 65 and the lever 24 will be moved from the position illustrated in Figure 4, to that illustrated in Fig. 5, and this movement of the lever 24 will throw the clutch member 22 out of engagement with the clutch member 19, and the contact member 49 having later passed beyond the position illustrated in Fig. 5, the two contact members will be rocked to assume the relative positions illustrated in Fig. 3 by their respective springs 53 and 54.

When the shifting lever is rocked by the contact members as just described, the upper end thereof will be moved toward the left, Fig. 1, and this will move the spring actuated member 37 toward the left, and its shoulder 39 in the bracket 38 will also be moved toward the left and thus will compress the spring 40, which, during the operation hereinbefore described, expanded while moving the member 37 toward the right. Furthermore during the movement of the member 37 toward the left, the notch 43 will come in alignment with the spring actuated stop 44 and the lower end of the stop 44 will then spring into the notch 43 and lock the member 37 in the position illustrated in Fig. 1 with the clutch members out of engagement and with the contact members 49 and 50 in the relative positions illustrated in Fig. 3.

It will be noted that in effect the contact member 50 forms a part of the shifting lever 24 and might be rigidly fastened thereto without departing from the spirit of my invention.

I claim:

1. A clutch comprising two interlocking members, means to rotate one of said members, a rotatable shaft, the other of said members being non-rotatably mounted on said shaft, shifting means adapted to move one of said members into interlocking engagement with the other and a contact member pivoted on one of said clutch members and with an eccentrically disposed contact face thereon adapted to engage said shifting means and move one of said clutch members out of engagement with the other.

2. A clutch comprising two interlocking members, means to rotate one of said members, a rotatable shaft, the other of said members being non-rotatably mounted on said shaft, shifting means adapted to move one of said members into interlocking engagement with the other and a contact member pivoted on one of said clutch members and with an eccentrically disposed contact face thereon adapted to engage said shifting means and move one of said clutch members out of engagement with the other and means to limit the angle through which said contact member may be rocked on its pivot.

3. A clutch comprising two interlocking members, means to rotate one of said members, a rotatable shaft, the other of said members being non-rotatably mounted on said shaft, shifting means adapted to move one of said members into interlocking engagement with the other and a contact member pivoted on one of said clutch members and with an eccentrically disposed contact face thereon adapted to engage said shifting means and move one of said clutch members out of engagement with the other and said shifting means out of the path of said contact member.

4. A clutch comprising two interlocking members, means to rotate one of said members, a rotatable shaft, the other of said members being non-rotatably mounted on said shaft, shifting means adapted to move one of said members into interlocking engagement with the other and a contact member pivoted on one of said clutch members and with an eccentrically disposed contact face thereon adapted to engage said shifting means and move one of said clutch members out of engagement with the other, and a spring acting to hold said contact member normally out of engagement with said shifting means.

5. A clutch comprising two interlocking members, means to rotate one of said members, a rotatable shaft, the other of said members being non-rotatably mounted on said shaft, shifting means adapted to move one of said members into interlocking engagement with the other, a contact member pivoted on one of said clutch members and with an eccentrically disposed contact face thereon, a contact member pivoted on said shifting means and with an eccentrically disposed contact face thereon, the contact face on one of said contact members being adapted to engage the contact face on the other of said contact members to move one of said clutch members out of engagement with the other.

6. A clutch comprising two interlocking members, means to rotate one of said members, a rotatable shaft, the other of said members being non-rotatably mounted on said shaft, shifting means adapted to move one of said members into interlocking engagement with the other, a contact member pivoted on one of said clutch members and with an eccentrically disposed contact face thereon, a contact member pivoted on said shifting means and with an eccentrically disposed contact face thereon, the contact face on one of contact members being adapted to engage the contact face on the other of said contact members to move one of said clutch members out of engagement with the other and means to limit the angle through which each of said contact members respectively may be rocked on its pivot.

7. A clutch comprising two interlocking members, means to rotate one of said members, a rotatable shaft, the other of said members being non-rotatably mounted on said shaft, shifting means adapted to move one of said members into interlocking engagement with the other, a contact member pivoted on one of said clutch members and with an eccentrically disposed contact face thereon, a contact member pivoted on said shifting means and with an eccentrically disposed contact face thereon, the contact face on one of said contact members being adapted to engage the contact face on the other of said contact members to move one of said clutch members out of engagement with the other and a spring acting to hold each of said contact members respectively normally out of engagement with the other.

8. A clutch comprising two interlocking members, means to rotate one of said members, a rotatable shaft, the other of said members being non-rotatably mounted on said shaft, spring actuated shifting means adapted to move one of said members into interlocking engagement with the other, a contact member pivoted on one of said clutch members and with an eccentrically disposed contact face thereon, a contact member pivoted on said shifting means and with an eccentrically disposed contact face thereon, the contact face on one of said contact members being adapted to engage the contact face on the other of said contact members to move one of said clutch members out of engagement with the other and a spring acting to hold each of said contact members respectively normally out of engagement with the other.

9. A clutch comprising two interlocking members, means to rotate one of said members, a rotatable shaft, the other of said members being non-rotatably mounted on said shaft, spring actuated shifting means adapted to move one of said members into interlocking engagement with the other, a contact member pivoted on one of said clutch members and with an eccentrically disposed contact face thereon, a contact member pivoted on said shifting means and with an eccentrically disposed contact face thereon, the contact face on one of said contact members being adapted to engage the contact face on the other of said contact members and move one of said clutch members out of engagement with the other and a spring acting to hold each of said contact members respectively normally out of engagement with the other and means to normally lock said shifting means with its contact member out of engagement with the other of said contact members.

In testimony whereof I have hereunto set my hand in presence of two subscribing witnesses.

EDWARD C. BATCHELDER.

Witnesses:
 HENRY B. TILTON,
 ELLEN MORRISSEY.